United States Patent [19]

Imoto et al.

[11] Patent Number: 4,726,643
[45] Date of Patent: Feb. 23, 1988

[54] OPTICAL STAR COUPLER AND METHOD FOR MANUFACTURING THE SAME

[75] Inventors: Katsuyuki Imoto, Sayama; Minoru Maeda, Nishitama; Masayoshi Kameyama, Sagamihara; Yasushi Ikuta, Nishitama; Hiroshi Araki, Katsuta; Shigeru Oho, Hitachi, all of Japan

[73] Assignee: Hitachi, Ltd., Tokyo, Japan

[21] Appl. No.: 772,914

[22] Filed: Sep. 5, 1985

[30] Foreign Application Priority Data

Sep. 6, 1984 [JP] Japan ................. 59-186964
Nov. 7, 1984 [JP] Japan ................. 59-233150

[51] Int. Cl.⁴ .................................. G02B 6/28
[52] U.S. Cl. .................. 350/96.16; 350/96.21
[58] Field of Search ................. 65/4.2, 4.21, 4.3; 350/96.15, 96.16, 96.20, 96.21, 96.24

[56] References Cited

U.S. PATENT DOCUMENTS

| | | | |
|---|---|---|---|
| 4,087,156 | 5/1978 | Kao et al. | 350/96.21 |
| 4,291,940 | 9/1981 | Kawasaki et al. | 350/96.15 |
| 4,377,403 | 3/1983 | McLandrich | 65/4.21 X |
| 4,439,221 | 3/1984 | Smyth et al. | 65/4.21 |

FOREIGN PATENT DOCUMENTS

| | | | |
|---|---|---|---|
| 1118621 | 2/1982 | Canada . | |
| 2839428 | 3/1980 | Fed. Rep. of Germany . | |
| 0065204 | 4/1986 | Japan | 350/96.16 |
| 1290410 | 12/1986 | Japan | 350/96.16 |

OTHER PUBLICATIONS

Rawson, E. G. et al., "Bitaper Star Couplers w/ 100 Fiber Channels", *Electronic Letters,* vol. 15, No. 14, 7/5/79, pp. 432–433.
Imoto, K. et al., "New Biconically Tapered Fiber Star Coupler: Structure and Fabrication", *Electronic Letters,* vol. 21, No. 11, 5/23/85, pp. 514–515.

*Primary Examiner*—Eugene R. Laroche
*Assistant Examiner*—Steven J. Mottola
*Attorney, Agent, or Firm*—Antonelli, Terry & Wands

[57] ABSTRACT

An optical star coupler having a biconically tapered optical star coupler inserted and suspended in a protection tube and the method for manufacturing the same are disclosed. The manufacturing method provides that an optical fiber bundle is inserted into a protection tube such as hollow glass tube, then the optical fiber bundle is twisted and pulled while it is indirectly heated through the protection tube, thereby forming a twisting, fusing and pulling portion. Both ends of the protection tube are then sealed with an adhesive agent to fix the optical fiber bundle to the protection tube. This optical star coupler can be constructed so as to be connected in tandem without any splicing. The optical star coupler of the present invention, in the case of an optical star coupler using multi-mode optical fibers, and particularly in the case of one equally divided optical star coupler using single-mode optical fiber, also provides low insertion loss, less power deviation and low manufacturing costs.

18 Claims, 23 Drawing Figures

FIG. 1 PRIOR ART

FIG. 2 PRIOR APT

OPTICAL STAR COUPLER AND METHOD FOR MANUFACTURING THE SAME

BACKGROUND OF THE INVENTION

The present invention relates to an optical star coupler for dividing optical beams transmitted through optical fibers between a plurality of optical fibers and a method of manufacturing the optical star coupler.

Accompanying the rapid progress of fiber optic transmission technology, the research and development of optical data links using optical fibers in data transmission between an electronic computer and another electronic computer or between an electronic computer and a terminal have been actively pursued. For constructing the optical data links, an optical star coupler which can mix the optical signals from a plurality of input optical fibers and divide them equally between a plurality of output optical fibers at low loss is an indispensable device.

Figure 1:
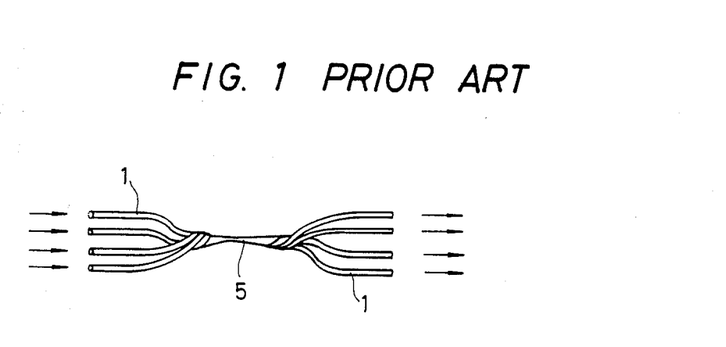
FIG. 1 is a plan view showing a conventional optical star coupler.

As a typical optical star coupler, there so far has been a biconically tapered type as shown in FIG. 1. Such biconically tapered optical star coupler is shown, for instance, in i) "Optical Communication Handbook" edited by Hisayoshi Yanai and issued by Asakura-Shoten on Sept. 1, 1982, pages 324 and 325, ii) T. Ozeki et al.: Electronics Letters, Vol. 12, No. 6 (1976), pages 151 and 152, and iii) E. G. Rawson et al.: Electronics Letters, Vol. 14, No. 9 (1978), pages 274 and 275, it is accordingly well known. This will be explained hereunder by using FIG. 1. This optical star coupler, in which multiple optical fibers 1 are bound in one portion and are provided with "twisting" and fused and stretched during heating to form a tapered region 5 in the central portion thereof, divides the optical signals from the input optical fiber (at the left of the tapered region 5) between a plurality of output optical fibers (at the right of the tapered region 5). The arrows in FIG. 1 indicate the direction in which the optical signals propagate. In this biconically tapered optical star coupler, it is reported that a favorable characteristic is obtained in the case that multi-mode optical fibers are used and the number of optical fibers is four or more. However, there are fewer reports for the case that single-mode optical fibers allowing long-distance and large-capacity transmission are used and that the numbers of the input and output ports are constructed in the ratio of 2:2, and it can not be said that the characteristics as shown in such reports are favorable. For the study by the present inventors, it turned out that it is particularly very difficult to realize an equally divided optical star coupler by using single-mode optical fibers.

Figure 2:
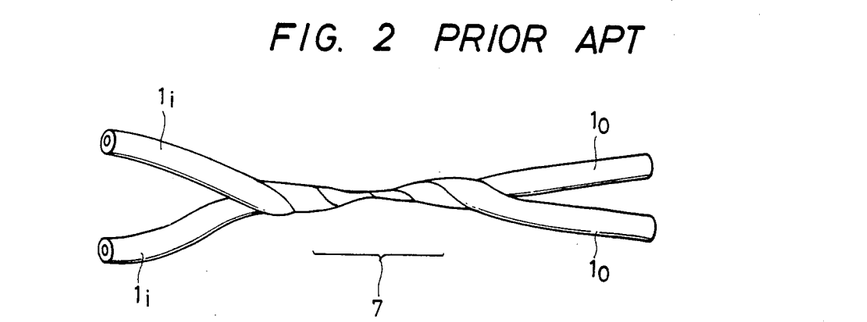
FIG. 2 is a perspective view of a conventional optical star coupler.

That is, the present inventors repeatedly experimented with the construction as shown in FIG. 2 varying the twisting number, pulling length and fusing extent of the twisting, fusing and pulling portion 7 (corresponding to the tapered region 5 in FIG. 1). In FIG. 2, li designates input optical fiber and lo designates output optical fiber. But, an optical star coupler of low insertion loss and less power deviation cannot be realized. An attempt to obtain low insertion loss will produce extremely great power deviation of 10 dB or more, and an attempt to achieve less power deviation will make insertion loss to be 10 dB or more thereby, acting against one another. In addition, the outer diameter (clad diameter: 125 $\mu$m) of each optical fiber corresponding to the twisting, fusing and pulling portion 7 was made 20 $\mu$m by etching, and the cores in the respective optical fibers (core diameter: about 10 $\mu$m, necessary to be made as small as this to realize single-mode optical fiber) were made close to each other to try to achieve tight coupling. In this case, power deviation could easily be reduced for the optical fiber diameter that is on the order of 20 $\mu$m, but, conversely, it proved that the twisting, fusing and pulling portion 7 broke or bent in the center thereof in the twisting, fusing and pulling process because of the small optical fiber diameter and this lowered the reliability to a great extent. Eventually, in consideration of this point, the outer diameter of an optical fiber which can be handled by this method was on the order of 60 $\mu$m at the minimum. However, for the optical fiber diameter on the order of 60 $\mu$m, sufficient coupling could not be achieved because of too wide a space between the cores, and power deviation for single-mode optical fiber was 10 dB or more for 6 dB or less insertion loss.

From the reason described above, it turned out that, in the biconically tapered optical star coupler, application of a single-mod optical fiber allowing long-distance and large-capacity transmission is difficult if a twisting, fusing and pulling portion is merely formed and that application to multi-mode optical fiber having the ratio of 2:2 of the mumbers of input and output ports is also difficult.

Further, in the manufacturing aspect, as described above, it is necessary to pull the outer diameter of the tapered region 5 as thin as a dozen $\mu$m to a hundred and several tens of $\mu$m in the forming a single-mode optical fiber, and, at this time, the pulled portion can be damaged or it can break when it is handled. In addition, an oxyhydrogen burner is usually used as the heating source which is utilized for pulling, there is a problem that the fused portion can be bent or deformed by the wind pressure of the oxyhydrogen burner, or it can be excessively fused so that a outer diameter cannot be controlled to the desired value, and the yield rate of manufacturing will accordingly be very bad. Particularly, when the input and output port numbers are small, it is necessary to make the outer diameter of the above region some dozen $\mu$um to several tens of $\mu$um (this value varies according to the clad thickness), so/the above problem is more serious.

Moreover, OH ions or transition metal ions mix into the twisting, fusing and pulling portion from the flame of the oxyhydrogen burner and the air in the atmosphere, causing optical absorption loss.

Figures 3A, 3B, 4A, 4B:
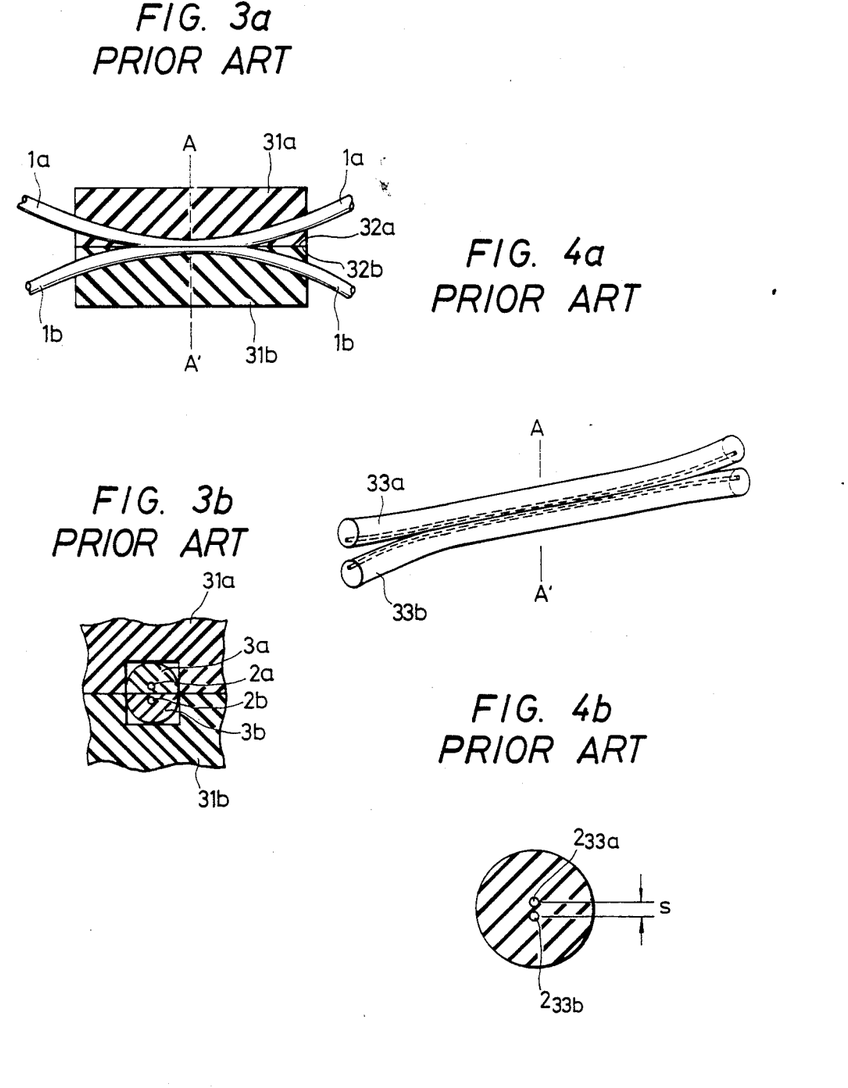

As a prior of optical power divider (optical star coupler) of 2 to 2 type using single-mode optical fiber, some examples are shown in FIGS. 3a, 3b, 4a and 4b. In FIGS. 3a and 3b, optical fibers 1a and 1b are respectively embedded in blocks 31a and 31b, and adhesively fixed, and planes 32a and 32b are put together after they are ground. FIG. 3b shows the enlarged A-A' section in FIG. 3a. By doing so, the space between the respective cores 2a and 2b of the optical fibers 1a and 1b is made very close thereby to enhance the coupling efficiency. However, grinding thickness controllability is poor and a long manufacturing time is required, thus, the manufacturing cost becomes extremely high. Numerals 3a and 3b in FIG. 3b designate the clads of the optical fibers 1a and 1b, respectively.

In FIGS. 4a and 4b, optical fibers 33a and 33b having cores with concentricity error are used to make the space s (several $\mu$m) between the respective cores $2_{33a}$ and $2_{33b}$ closer. FIG. 4b shows the enlarged section A-A' of FIG. 4a. In this construction, however, it is difficult to make the optical fibers 33a and 33b having cores with concentricity error, and the manufacturing cost will rise. In addition, when the core space is made minimum to perform the fusing, it cannot be determined whether it is made minimum, so the manufacturing yield rate becomes a problem.

As already described above, an oxyhydrogen burner or an electric furnace is usually used as the heating source of optical fibers. By the method using an oxyhydrogen burner, the temperature can be increased or decreased within a short time, but the twisting, fusing and pulling portion is deformed easily by the wind pressure of the burner, flame temperature and disturbance. Namely, the form control of the above twisting, fusing and pulling portion is almost impossible, thus the yield rate is very bad and there is a problem in reproducibility and mass-productivity. The method using an electric furnace can control the above disturbance, but the temperature increases or decreases very slowly so that there is a problem that optical fibers cause undesirable deformation during the increase or decrease of the temperature. As described above, it is difficult to make an optical star coupler having favorable optical characteristics at a good yield rate by using the prior art. In addition, the yield rate becomes very bad, so it is also difficult to lower the cost.

As described above, it was difficult to realize an optical star coupler for simgle-mode optical fiber permitting long-distance and large-capacity transmission, an equally divided single-mode optical star coupler having the ratio of n:n input and output port numbers, and further multi-mode optical star coupler having the ratio of n:n input and output port numbers with low insertion loss, low power deviation and low cost. The above described "n" means 2 or more.

Figure 5:
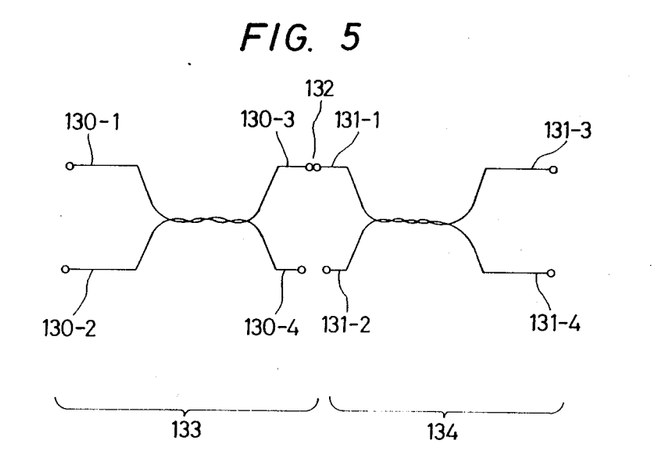
FIG. 5 is an illustration for explaining tandem connection of two optical star couplers.

Recently, as shown in FIG. 5, such construction (hereinafter referred to as optical star coupler connected without any splicing) as connecting the output port fiber 130-3 and the input port fiber 131-1 of two optical power dividers 133 and 134 in tandem connection (connection part 132) is beginning to be utilized in various systems. In this case, an attempt to make the construction by using two such optical star couplers as shown in FIG. 1 or FIG. 2 will produce connection loss at the connection part 132, increasing the overall loss. In addition, if the connection is performed by the thermal splicing method or the like, it is necessary to make the lengths of the fibers 130-3 and 131-1 sufficiently long, and the loss will increase to that extent. The size of the optical power divider also increases. Further, an additional process such as thermal splicing work increases the cost. As described above, it proved that the construction provided by combination of separately made optical power dividers includes various problems.

In FIG. 5, numerals 130-1, 130-2, 130-4, 131-2, 131-3 and 131-4 designate input and output port fibers.

Summary of the Invention

The object of the present invention is to provide an optical star coupler and a method for manufacturing it, by which the above problems of the prior art are overcome and low insertion loss, less power deviation and low cost can be realized for single-mode and multi-mode optical fibers, particularly per an optical star coupler an equally divided single-mode optical fiber having the ratio of n:n of input and output port numbers.

Another object of the present invention is to provide a low loss, compact and low cost optical star coupler connected without any splicing and a method for manufacturing it.

To achieve the above objects, the optical star coupler of the present invention comprises a biconically tapered optical star coupler, at least the twisting, fusing and pulling portion of which is suspensively inserted in a protection tube such a hollow glass tube.

The above optical star coupler of the present invention is manufactured by inserting an optical fiber bundle into a protection tube such as hollow glass tube and forming a twisting, fusing and pulling portion by pulling the optical fiber bundle during the twisting and heating of it, and the heating is carried out by heating the above protection tube with a burner such as an oxyhydrogen burner to indirectly heat the fibers. On the ends of the protection tube, the optical fiber bundle is adhesively fixed.

Although the biconically tapered optical star coupler which is inserted into the protection tube can be a well-known conventional one, a more preferable result can be obtained if a twisting portion or twisting and fusing portion is provided in both sides of the tapered twisting, fusing and pulling portion in the center thereof. The above twisting and fusing portion is a portion where the bundled optical fibers are only twisted and fused, but pulling work as in the tapered central portion is not performed. If a twisting portion which is only twisted is provided instead of the twisting and fusing portion, the resultant effect is almost the same as that obtained by provision of the twisting and fusing portion. The twisting portion can maintain its twisting condition since the optical fiber bundle is fixed to the protection tube at both ends thereof.

The above protection tube such as hollow glass tube is adapted to have such an internal diameter that the gap between the inserted bundled optical fibers and the protection tube is 1–10mm, and the tube thickness is to be 0.3–1.5mm. If the above gap is less than 1mm, the danger that the optical fibers make contact with the inner wall of the glass tube at the time of heating is increased, and if larger than 10 mm, not only sufficient heating of the optical fibers becomes difficult, but also the temperature distribution becomes broad so that the fusing extent of the optical fibers becomes excessively broad—either is not preferable. If tube thickness is less than the above range, strength becomes insufficient, and if greater, it is difficult to heat. The above protection tube should have a length enough to sufficiently cover the portion including twists. Although the protection tube is allowed to be longer, it is preferable to make it as short as possible provided that the above is satisfied. Usually, it is convenient that the sectional shape of the protection tube is made to a circle, but it is not necessarily be limited to a circle.

Usually, the above protection tube is quartz or glass containing quartz as its main component and having a softening point higher than that of the inserted optical fibers. Usually, the protection tube is glass containing 60 wt % or more quartz.

The optical fibers in the hollow quartz tube are suspended without contacting the tube wall, and the optical fibers are adhesively fixed on the ends of the quartz tube.

The above protection tube containing an optical star coupler is preferably filled with liquid such as silicone or resin such as various plastic materials, and this filling up not only lightens mechanical vibration and impact thereof to strengthen the optical fibers, but also provides a cladding mode stripping effect.

Each number of twisting of the above two twisting and fusing portions provided to obtain more preferable characteristics is within 10 or desirably about 5, and each length is within 50 mm. In the case that the length of the twisting and fusing portion is greater than 50 mm, the optical coupling between each optical fiber becomes weak and it is necessary to make the twisting, fusing and pulling portion in the tapered central portion longer to obtain sufficient characteristics.

When manufacturing the optical star coupler of the present invention, the atmosphere in the hollow glass tube is desirably clean, and inert gas or oxidizing gas other than air is also used as well as air.

The above twisting and fusing portions are formed by providing a predetermined number of twists to the above optical fiber bundle and thereafter indirectly heating it as described above.

The twisting, fusing and pulling portion is formed by providing a predetermined number of twists to the optical fiber bundle and thereafter pulling the fiber bundle as well as indirectly heating it. However, further twists can be provided during heating and pulling. The heating temperature is a temperature at which the heated portion of the optical fiber bundle can be pulled, and the heating condition to obtain that temperature can easily be determined by experiment. The twisting, fusing and pulling portion is well known, and the method for forming it is also basically well known except that the heating method is indirect.

Therefore, the method for manufacturing an optical star coupler of the present invention comprises (i) a step of inserting an optical fiber bundle including n optical fibers (n: 2 or more) into a protection tube such as a hollow glass tube, (ii) a step of forming a twisting, fusing and pulling portion in the optical fiber bundle in the protection tube by providing twists, indirect heating through the protection tube and pulling to the optical fiber bundle, and (iii) a step of sealing both ends of the protection tube with an adhesive agent to fix the protection tube and the suspended optical fiber bundle. In addition, if a twisting and fusing portion is formed by twisting and indirectly heating in the step (ii) and thereafter heating and pulling are further provided in the vicinity of the central portion to form a twisting, fusing and pulling portion, and a further twisting and pulling portion is formed by indirectly heating another predetermined portion again if necessary, and then proceeding to the next step (iii), an optical star coupler having a twisting and fusing portion can be obtained.

Further, as the protection tube used in the manufacturing process of the optical star coupler of the present invention, a semicircular tube glass or U-shaped glass can be used instead of the hollow glass tube, and the open end of the semicircular glass or U-shaped glass can be covered with a glass plate to form a glass tube after forming a twisting, fusing and pulling portion or after forming a twisting, fusing and pulling portion and twisting and fusing portions. Alternatively the optical fiber bundle can be inserted into another protection tube after the above forming of the twisting, fusing and pulling portion.

Moreover, the optical star coupler connected without any splicing of the present invention comprises an optical star coupler connected without any splicing in which two optical star couplers of the present invention are juxtaposed, a shared optical fiber having no splicing portion is included in the two optical fiber bundles so that it returns, and the ends of n optical fibers come on one side of each protection tube and the ends of (n-1) optical fibers come on the other side. The manufacturing method includes the steps of juxtaposing two protection tubes and inserting optical fiber bundles, each comprising n optical fibers, into the two protection tubes and constructing them so that one optical fiber having no splicing portion is included in the two optical fiber bundles so that it returns, and causing the ends of n optical fibers to come on one side of each protection tube and the ends of (n-1) optical fibers to come on the other side thereof. This method further comprises the steps of providing twists to each optical fiber bundle, heating the protection tubes to provide twisting, fusing and pulling to the optical fiber bundle in each protection tube, and sealing both ends of each protection tube with an adhesive agent to fix the protection tube and the optical fiber bundle.

Since the optical star coupler (an optical star coupler connected without any splicing) of the present invention can be produced with an integrated process, the manuacturing costs are lowered. In addition, it is a manufacturing method using indirect heating of the optical fiber bundle, thus the optical fiber bundle is not excessively deformed by the wind pressure or flame of the burner, disturbance or the like and form control of the twisting, fusing and pulling portion is accordingly very good. Since impurities causing absorption loss such as a large amount of moisture, transition metal ions and the like contained in the flame of the burner do not diffusively intrude into the optical fibers, low insertion loss is achieved. Due to good form controllability, optical output deviation (power deviation) of each output port fiber can be suppressed extremely small.

BRIEF DESCRIPTION OF THE DRAWINGS

FIG. 3a is a sectional view of another conventional optical star coupler;

FIG. 3b is another sectional view of the optical star coupler as shown in FIG. 3a;

FIG. 4a is a schematic illustration of still another convential optical star coupler;

FIG. 4b is a sectional view of the optical star coupler as shown in FIG. 4a;

DESCRIPTION OF THE PREFERRED EMBODIMENTS

Embodiment 1

Figure 6:
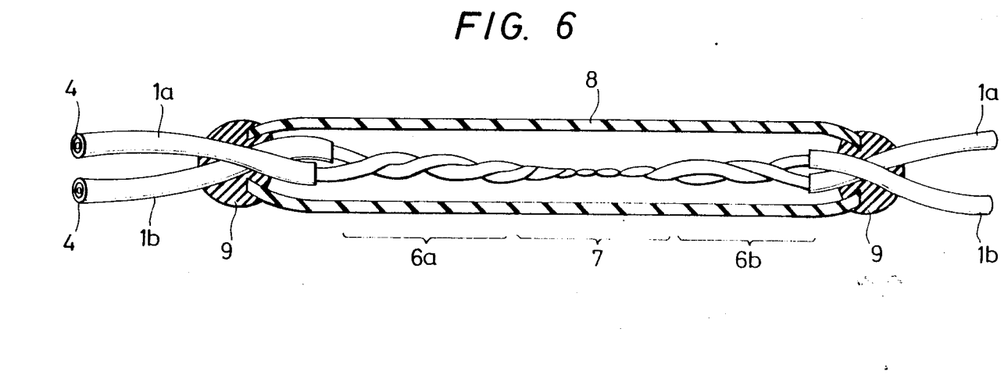
FIG. 6 is a schematic illustration of the optical star coupler in one embodiment of the present invention.

FIG. 6 is a schematic illustration of the optical star coupler according t this embodiment.

Numerals 1a and 1b designate silicone coated single-mode optical glass fibers (core diameter: 10 μum and clad diameter: 125 μum, hereinafter merely referred to as optical fibers), 4 designates coating material (silicone) of the optical fiber 1, 6a and 6b designate twisting and fusing portions or twisting portions, 7 designates a twisting, fusing and pulling portion, 8 designates a protection tube (high silica glass tube having 6 mm outer diameter and 4 mm internal diameter is used in this embodiment), 9 designates an adhesive agent for bonding and fixing the protection tube 8 and the optical fibers 1a and 1b. In this embodiment, "Araldite" (trade mark of Epoxy Technology, Inc. in U.S.A.) was used.

As the protection tube 8, quartz glass or high silica glass tube can be used.

As shown in FIG. 6, in this embodiment, the portions of optical fibers 1a and 1b corresponding to the twisting and fusing portions 6a and 6b and the twisting, fusing and pulling portion 7 are stripped of silicone, namely the coating material 4.

However, it is allowed to use an optical fiber which is not coated at all from the first and comprises only core and clad.

The number of twists in the twisting and fusing portions 6a and 6b is about 5 respectively, and power deviation decreases as the number of twists increases. The lengths of the twisting and fusing portions 6a and 6b are desirably about 5 cm respectively. Further, if the twist pitch is not about 5 mm or greater, breakage or increase of micro-bending loss will occur.

The length of the twisting, fusing and pulling portion 7 after pulling is about 10 cm at maximum, and pulling magnification of this portion is preferably on the order of 1.5–15. Power deviation decreases as pulling magnification increases, but the core diameter of this portion becomes small and the normalized frequency V also becomes smaller than 2 (V<2.4 for single-mode optical fiber) so that characteristic deviation is easily caused by the surface condition of this portion. That is, the normalized frequency V is expressed by $$V = \frac{2\pi a}{\lambda} \sqrt{\eta_1{}^2 - \eta_2{}^2} \quad (1)$$

wherein a is core diameter, λ is wave length, $n_1$ is refractive index of the core, and $n_2$ is refractive index of the clad, and, accordingly the normalized frequency V is proportional to the core diameter a. For the same reason, the twisting and fusing portions 6a and 6b and the twisting, fusing and pulling portion 7 are suspensively held in the protection tube 8, and the surface condition thereof is kept clear and the boundary condition is prevented from changing.

In addition, the number of optical fibers is not limited to 2, but it can be larger than 2, for instance, a hundred and several tens. Further, it is needless to say that this embodiment can be applied to multi-mode optical fibers other than single-mode optical fibers. It also goes without saying that this embodiment is not limited to the case of equal dividing in which the ratio of input and output port numbers is n:n, but it can be applied to an optical star coupler of any dividing ratio.

Next, the measurement examples of optical characteristic of the optical star coupler shown in FIG. 6 are described.

First, the length of the portion of the optical fibers 1a and 1b which was stripped of the coating material 4 (silicone or nylon coated silicone) by chemical or mechanical process was made 40 mm, and 5 twists were provided within this 40 mm length after inserting the optical fibers 1a and 1b into the protection tube 8. Although the optical fibers of the portion stripped of the coating material can be used after they are etched to a thin clad diameter, such etching was not utilized in this embodiment. Next, the protection tube 8 was heated with a burner to indirectly heat the twisting and fusing portion 6a (about 15 mm long) to fuse it. Then, the twisting, fusing and pulling portion 7 (around 10 mm long) was fused, pulled and twisted two times while it was heated, and its length reached almost 40 mm (pulling magnification: 4). After that, the twisting and fusing portion 6b (around 15 mm long) was heated and fused. Then, the optical fibers 1a and 1b were bonded and fixed to the ends of the protection tube. The protection tube 8 comprises a hollow glass tube 90 mm long.

When the characteristics of this optical star coupler were measured, insertion loss was 0.2 dB and power deviation was 0.1 dB at the wave length of He-Ne laser.

In addition, when the twisting, fusing and pulling portion 7 (about 10 mm long) was fused and pulled while it was twisted three times and reached the length of 60 mm (pulling magnification 6.0) under the same condition as the above except the twisting, fusing and pulling portion 7, insertion loss slightly increased and power deviation slightly decreased.

Further, when the manufacturing was made under the same condition as the first except that the optical fibers 1a and 1b were twisted four times within the length of the portion (40 mm) stripped of the coating material 4, insertion loss decreased very slightly and power deviation somewhat increased. Namely, it turned out that, when the number of twists in the twisting and fusing portions 6a and 6b decreases, power deviation increases.

Description has been provided for the case that 6a and 6b in FIG. 6 are twisting and fusing portions. However, when heating was applied only to the twisting, fusing and pulling portion 7, and portions 6a and 6b were merely twisted but not heated, an optical star coupler having twisting portions 6a and 6b was obtained and the characteristic was similar to that in the case that above 6a and 6b are twisting and fusing portions.

Thus, the optical star coupler of this embodiment is inserted in a hollow glass tube and provided with the twisting and fusing portions 6a and 6b on both sides of the twisting, fusing and pulling portion 7, so that low insertion loss and less power deviation can be realized even to an optical star coupler for single-mode optical fiber permitting long-distance and large-capacity transmission. Further, it proved that the optical star coupler of this embodiment hardly varies in the characteristic according to the change of the emvironmental condition, since it is suspensively held by the hollow glass tube 8.

Next, the method of manufacturing the optical star coupler of the present invention is described.

Embodiment 2

FIGS. 7a–7d illustrations showing the steps of the method for manufacturing the optical star coupler of this embodiment.

Figure 7A:
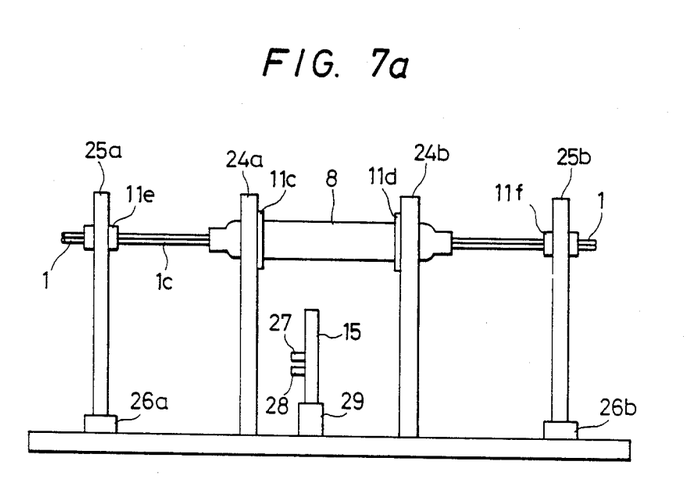
FIG. 7a–7d are side views showing the manufacturing process of the optical star coupler in one embodiment of the present invention.

FIG. 7a is an illustration showing the first step of this embodiment. Prior to explanation of the first process, the apparatus used in this embodiment is explained. Numeral 1 disignates optical fibers, and 1c an optical fiber bundle binding the optical glass fibers 1. The optical fibers 1 used in the present embodiment are single-mode optical fiber having 10 µm of core diameter and 40 µm of clad diameter. Numeral 8 designates a protection tube consisted of a hollow glass tube, and the outer diameter of both ends of this tube are made thinner so that the optical fiber bundle 1c and both ends of this protection tube 8 can be bonded and fixed to each other. The protection tube 8 used in this embodiment is a quartz glass tube having a 6 mm outer diameter, 90 mm length and 1 mm thickness.

Reference numerals 24a and 24b designate headstocks for respectively supporting chucks 11c and 11d; 25a and 25b designate headstocks for respectively supporting chucks 11e and 11f; 26a and 26b designate headstock moving mechanisms for respectively moving the headstocks 25a and 25b and 27, 28 and 29 designate an oxygen inlet and hydrogen inlet of a heating source 15, and heating source moving mechanism respectively. The chucks 11c, 11d, 11e and 11f are provided with a chuck rotating mechanism (not shown), respectively. As the heating source 15, an oxyhydrogen burner is used, and it is provided with the oxygen inlet 27 and hydrogne inlet 28.

First, the protection tube 8 is supported by the chucks 11c and 11d of the headstocks 24a and 24b. The optical fiber bundle 1c is inserted into the supported protection tube 8. Then, the optical fiber bundle 1c is supported by the chucks 11e and 11f of the outer headstocks 25a and 25b so that the optical fiber bundle 1c is suspended in the protection tube 8. The central axes of the internal headstocks 24a and 24b are previously coincident with those of the outer headstocks 25a and 25b. Accordingly, the optical fiber bundle 1c can be suspended without contacting the protection tube 8.

Figure 7B:
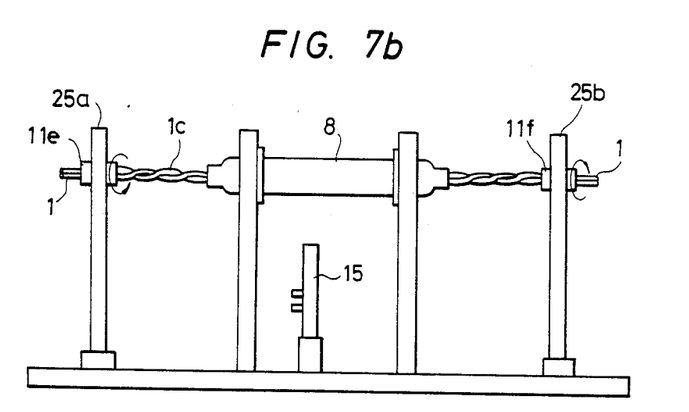

FIG. 7b is an illustration showing the following step.

As shown by arrows in the illustration, the optical fiber bundle 1c is twisted by rotating the chucks 11e and 11f around the axis of the optical fiber bundle 1c in the directions opposite to each other. Although the number of twists depends on the total length of the optical fiber bundle 1c and coupling ratio between the optical fibers 1, usually, 2–20 twists are provided if the total length of the optical fiber bundle 1c is on the order of 200 mm. Generally, it is necessary to increase the number of twists in proportion to the total length of the optical fiber bundle 1c. As the number of twists increases, it becomes possible that the core of each optical fiber 1 in the diametrical section of the above mentioned twisting, fusing and pulling portion 7 is kept circular. However, if the number of twists excessively increases, loss will increase and the pull length is needed to be set greater, so the number of twists is to be set according to the number of fibers, the outer diameter of optical fibers etc. By keeping the core section in substantially a circle as described above, an optical star coupler which has a coupling ratio without mode dependency can be realized.

Figure 7C:
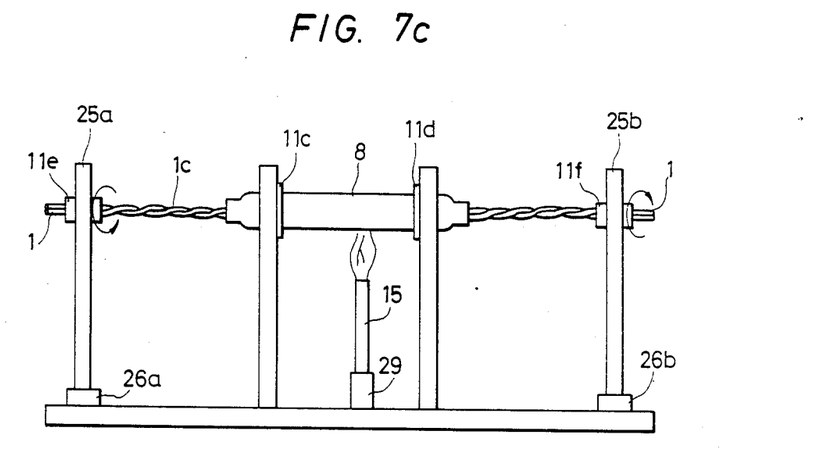

Next, as shown in FIG. 7c, to the optical fiber bundle 1c in the protection tube 8, a twisting, fusing and pulling process is provided in the central portion and a fusing process is provided in both sides thereof by the heating source 15. The atmosphere in the protection tube is air. When this is done, by rotating the chucks 11c and 11d in the same direction to rotate the protection tube 8 and uniformly heat the outer periphery thereof, the twisting, fusing and pulling process is carried out symmetrically, quickly and smoothly.

That is, the fired heating source 15 is moved by a heating source moving mechanism 29 at a predetermined speed along the axial direction of the protection tube 8 during rotation of the protection tube 8. By this, the twisted optical fiber bundle 1c in the protection tube 8 is softened and fused. In this embodiment, the moving speed is set to around 0.5 mm/sec. At the time when the fired heating source 15 passes the left portion of the protection tube 8, the twisting and fusing portion 6a shown in FIG. 6 is formed. At the stage in which the fired heating source 15 comes around the central portion, the chuck 11e and the chuck 11f are rotated a predetermined number of rotations within 10 in the directions opposite to each other, and, simultaneously, the headstocks 25a and 25b are moved by the headstock driving mechanisms 26a and 26b at a total speed of 0.5 mm/sec in the direction of pulling the optical fiber bundle 1c. This speed provides a linear or non-linear function between time and moving distance. By this, the twisting, fusing and pulling portion 7 shown in FIG. 6 is formed in length of about 40 mm.

Next, after the fired heating source 15 passes the vicinity of the central portion, the twisting to the optical fiber bundle 1c by the chuck 11e and the chuck 11f and the pulling by the headstock driving source 26a and 26b are stopped. By further moving the fired heating source 15 rightwards with the twisting and pulling process being stopped, the twisting and fusing portion 6b shown in FIG. 6 can be formed. In addition, it is also possible that, first, a twisting and fusing portion is formed in a predetermined portion of the optical fiber in the protection tube, and, then, the vicinity of the center of the above twisting and fusing portion is pulled.

Further, if heating is provided only to the vicinity of the central portion and the portions corresponding to 6a and 6b in FIG. 6 are merely twisted, twisting portions are formed instead of the twisting and fusing portions.

In the case that the moving speed of the heating source 15 was set to 0.5 mm/sec, the total steps of FIGS. 7a–7d could be completed in 30 minutes. 37 optical star couplers were manufactured for trial by such method, and insertion loss no greater than 0.2 dB and power deviation no greater than 0.1 dB could be realized.

To reduce power deviation as far as possible, it is also possible that a He-Ne laser light is made to be incident upon one optical fiber, and the heating, twisting, fusing and pulling are carried out while the output power is observed. When the output power is observed, rotation of the chuck 11e is desirably stopped.

Figure 7D:
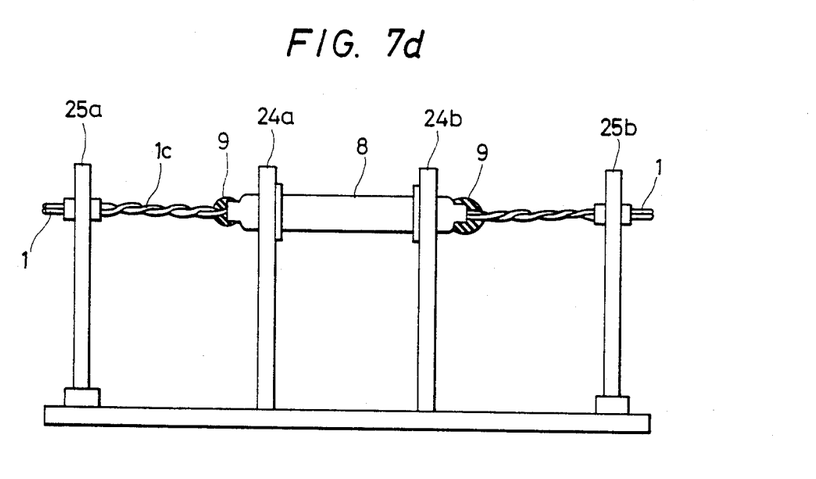

FIG. 7d is an illustration showing the following step. After the fusing process, twisting, fusing and pulling process and fusing process are provided to the optical fiber bundle 1c in the protection tube 8 by the above steps, an adhesive agent 9 is filled in both ends of the protection tube 8 to bond and fix the optical fiber bundle 1c and the protection tube 8.

In addition, in the case that a tubular burner parallel with the protection tube 8 and having many flame ports is used as the heating source 15 and heating is provided by moving the fired flame port sequentially from one end to the other end relative to the protection tube 8, or in the case that the heating range of the protection tube 8 is extended as wide as the width of the twisting, fusing and pulling portion by expanding the flame of an oxyhydrogen burner, it is unnecessary to move the heating source, and if a construction allowing the protection tube 8 to be uniformly heated from the outer periphery thereof, it is also unnecessary to rotate the protection tube 8.

Figure 9:
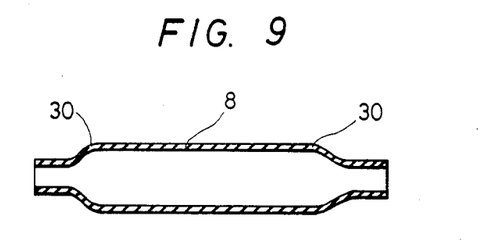

After oxidizing in inert gas is enclosed through a hole 30 in FIG. 9 into the protection tube 8 which was bonded and fixed, the hole can be closed or the tube 8 may be filled with liquid or resin (such as silicone material and plastic material). These liquid and resin have cladding mode stripping and optional fiber reinforcement effects. As the adhesive agent, thermoplastic, thermosetting, elastomer or mixed type one can be used. One method of the twisting, fusing and pulling process is that the twisting is first provided and the pulling is carried out during observation of the output power and the pulling is stopped when equal division is reached, and the other method is that the pulling is carried out while the twisting is provided. Either method can be used, however, the former has better controllability.

The twisting process of the optical fiber bundle 1c can be also performed by providing a chuck rotating mechanism on one of either the chuck 11e or the chuck 11f. Further, the pulling process can also be performed by providing a headstock moving mechanism on one of either the headstock 25a or the headstock 25b.

If the number of the optical fibers is small, the support of the protection tube 8 can be performed only by one headstock and chuck. Namely, it turned out by experiment that, even if the protection tube 8 is supported only at one end thereof and heated with such a temperature that the protection tube 8 does not deform, the twisting and fusing portions 6a and 6b and the twisting, fusing and pulling portion 7 can be sufficiently formed.

Figure 8:
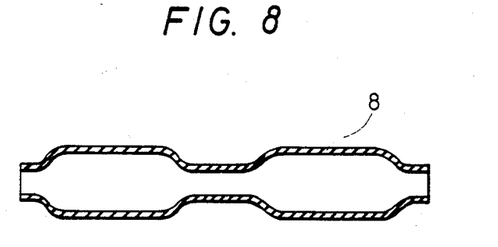
FIGS. 8–10 are sectional views showing the protection tubes of the optical star coupler of the present invention.
Figure 10:
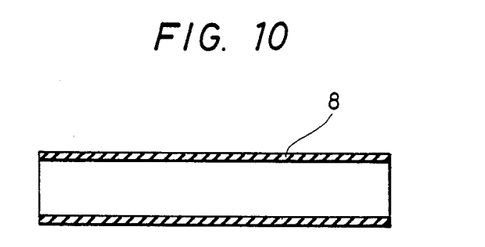

It is possible that the protection tube 8 has a shape in which it is thinned in the vicinity of the center as shown in FIG. 8, allowing heat to easily be transferred to the optical fiber bundle 1c. It is also possible that holes 30 are provided at the vicinity of both ends of the tube as shown in FIG. 9, allowing the adhesive agent 9 at the step of FIG. 7d to easily be inserted into the tube. Further, a straight protection tube as shown in FIG. 10 can also be used.

In this embodiment, the optical star coupler can be manufactured in an integrated process. Namely, the step of twisting the optical fiber bundle 1c, the step of forming the twisting and fusing portions 6a and 6b, the step of forming the twisting, fusing and pulling portion 7, and the step of forming suspension of the twisting and fusing portions 6a and 6b and the twisting, fusing and pulling portion 7 in the protection tube 8 can be carried out successively without removing the optical fiber bundle 1c which is inserted in the protection tube 8, so mass-production is possible. In addition, as indirect heating is utilized, even for a heating source such as oxyhydrogen burner, the fused portion is not bent or deformed by the wind pressure, and control on the outer diameter of the twisting, fusing and pulling portion 7 becomes easy. Further, no damage or breakage is caused in the time of manufacturing, so the yield rate increases and it is possible to plan to lower the cost. Moreover, since the heating process of the above optical fibers is carried out in a protection tube of clean atmosphere, intrusion of impurities in air (transition metals, alkali metals, alkaline earth metals and the like) can be suppressed and there is no dust sticking, so a low-loss optical star coupler can be made. Further, due to the indirect heating method through a protection tube such as hollow glass tube, a large amount of $H_2O$ generated from the oxyhydrogen burner does not diffusively intrude into the twisting, fusing and pulling portion, so that absorption loss due to OH ions can be greatly reduced and a low-loss optical star coupler can be realized. Particularly, very fine characteristics of an optical star coupler for long wave length (e.g. 1.3 $\mu$m, 1.55 $\mu$m and 1.2 $\mu$m) can be obtained. In addition, since the pull length can be controlled precisely, a lower loss and less power deviation optical star coupler could be obtained.

Embodiment 3

Figure 11:
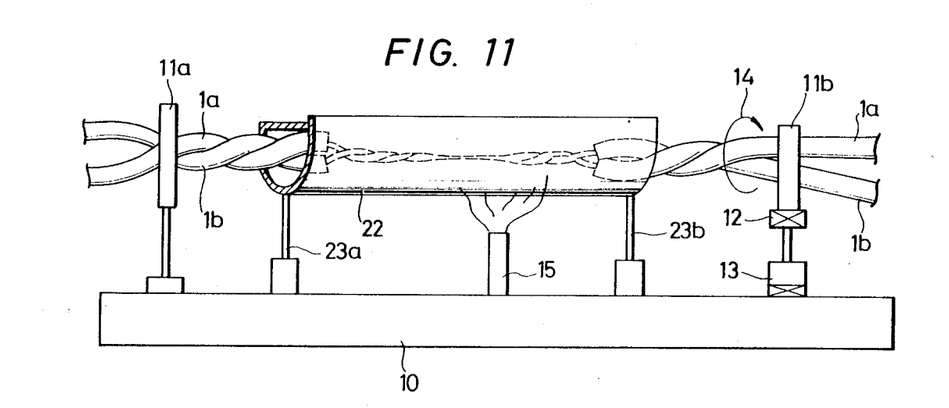
FIG. 11 is a schematic illustration showing the manufacturing process of the optical star coupler in another embodiment of the present invention.

The manufacturing process of this embodiment is shown in FIG. 11. In the above-mentioned embodiment 2, a hollow glass tube was used as the protection tube 8, but, in this embodiment, a semicircular tube glass 22 was used instead of the hollow glss tube. Although a semicircular tube glass is used as the protection tube, the heating to optical fibers 1a and 1b can be performed indirectly. The reason for indirectly heating the fibers is, similarly with the above-mentioned embodiments 1 and 2, to prevent the optical fibers 1a and 1b from being deformed or bent by the wind pressure of the heating source (oxyhydrogen burner) 15 thereby improving the manufacturing yield rate as well as precisely controlling the pull length, and to reduce the mixing of OH ions and other impurities, thereby reducing insertion loss and power deviation of the optical star coupler.

As a method of indirect heating, the semicircular tube glass (quartz glass in the case of this embodiment) 22 is supported by supports 23a and 23b in a position under the optical fibers 1a and 1b and heating is provided through this semicircular tube glass 22. In this case, oxyhydrogen is allowed to flow into the oxyhydrogen burner 15 at a rate of several l/min or more. The chuck rotating mechanism 12 can be provided on both sides, but it was provided on one side in this embodiment. After forming twisting and fusing portions and a twisting, fusing and pulling portion in a same manner as the embodiment 2 except the above, the optical star coupler of this embodiment is completed by covering the open side of the semicircular tube glass 22 with another glass plate to form a tube, or by inserting the twisting and fusing poritons and the twisting, fusing and pulling portion into another hollow glass tube after removing the semicircular tube glass 22, and by fixing both ends of the protection tube provided as this to the optical fibers 1a and 1b with an adhesive agent.

In FIG. 11, numeral 10 designates a base; 11a and 11b designate chucks for fixing the optical fibers 1a and 1b; 12 designates a chuck rotating mechanism for rotating the chuck portion 11b in the direction of an arrow 14 (the direction in which rotation is made by using the axes of the optical fibers 1a and 1b as the center); 13 designates a chuck moving mechanism for supporting the chuck 11b and the chuck rotating mechanism 12 and moving the base 10.

The optical star coupler of this embodiment manufactured as described above, this showed the same excellent characteristic as the optical star coupler of the embodiment 2.

Although the number of the optical fibers is 2 in the above embodiments, it is needless to say that each embodiment can be applied to an optical star coupler having three or more optical fibers.

It is possible that the above embodiments are applied to an optical star coupler of a construction other than shown in FIG. 6. Namely, it can also be applied to the manufacturing of another star coupler which does not contain the twisting and fusing portions 6a and 6b shown in FIG. 6 and has only the twisting, fusing and pulling portion 7. In this case, the step for forming the twisting and fusing portions at both sides of the twisting, fusing and pulling portion (7 in FIG. 6) in the step of FIG. 7c is omitted.

As a result of the trial manufacture of such optical star coupler, in the case of using multi-mode optical fiber, the values of around 0.2 dB were obtained as both insertion loss and power deviation for 2:2 type, and a similar value was obtained for single-mode optical fiber. In addition, in the case of multi-mode optical star coupler of 100 to 100 type, the value of 2.5 dB or less was obtained for insertion loss and the value of 1.0 dB or less was obtained for power deviation. That is, twisting was provided to the optical fiber bundle during heating of the protection tube. Then, pulling was made during the observation of the output power of the laser light incident upon one optical fiber. In this case, twisting was made several times, and the length of the pulled portion was about 50 mm. The number of twists was increased and the pull length became longer in accordance with increase of the number of optical fibers.

It is needless to say that the above embodiment can be applied not only to single-mode optical fiber but also to multi-mode optical fiber. Since the core diameter is on the order of 50 μm or 80 μm for multi-mode optical fiber, the outer diameter of the optical fiber thinned by etching is preferably on the order of 70 μm or 90 μm. However, a characteristic near to the above could be obtained without etching.

Further, although the dividing ratio of the above embodiment was 1:1, it is not limited to this and can be applied to the manufacture of an optical star coupler of any dividing ratio. For instance, a dividing ratio can freely be established by providing a different value to the outer diameter of the clad of the optical fibers to be bundled. For instance, the outer diameter of the clad of one optical fiber is set to 125 μm, and the outer diameter of the clad of the other optical fiber is set to 60 μm.

In addition, if a gas such as $N_2$, $O_2$, Ar or He is flowed into the protection tube during the step of FIG. 7c, an optical star coupler of lower loss can be realized. In this case, the gas is supplied from one end of the protection tube.

Embodiment 4

Figure 12:
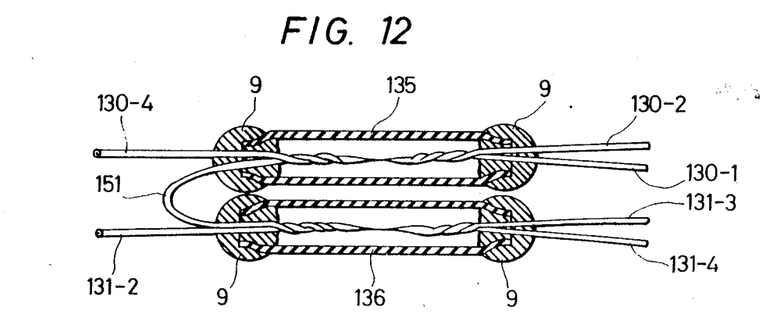
FIG. 12 is a schematic illustration showing the optical star coupler connected without any splicing in still another embodiment of the present invention.

This embodiment is related to an optical star coupler connected without any splicing, and FIG. 12 is a schematic illustration therefore. This is an embodiment in which the tandem connection type optical star coupler of FIG. 5 is constructed in an integrated construction without any splicing, and the connection portion 132 of FIG. 5 is not included. Namely, portions 130-1, 151 and 131-3 are constructed in one optical fiber. Further, the size is small and the arrrangement is substantially parallel. Input and output ports 130-1, 130-2, 131-3, 131-4, 130-4 and 131-2 are arranged on the left and right so that connection with other divice is easy. The constructions of the twisting, fusing and pulling portion and the twisting portion (or twisting and fusing portion) formed in a glass tubes 135 and 136 are the same as FIG. 6. A numeral 9 designates an adhesive agent.

Figure 13A:
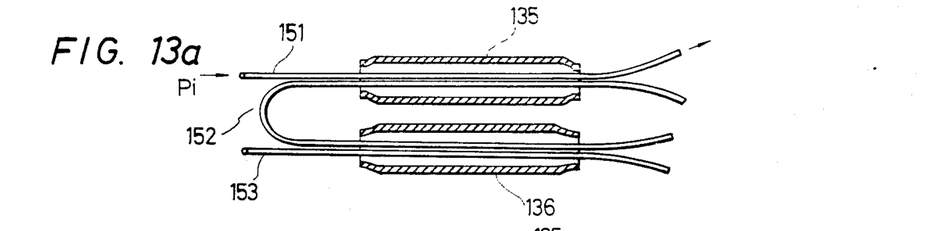
FIG. 13a–13d are schematic illustrations showing the manufacturing process of the optical star coupler as shown in FIG. 12.
Figure 13B:
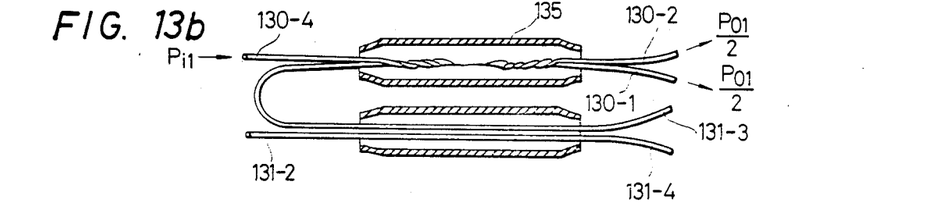
Figure 13C:
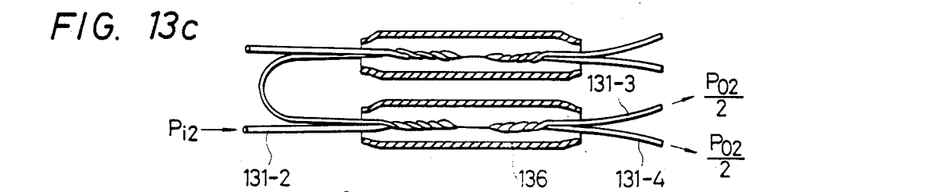
Figure 13D:
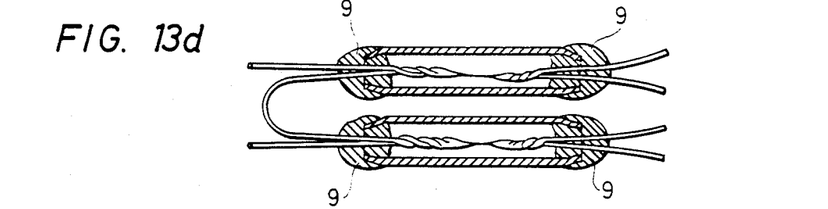

FIGS. 13a–13d show the method for manufacturing the optical star coupler of FIG. 12. It comprises 4 processes. The step (a) shown in FIG. 13a is a process of inserting optical fibers 151, 152 and 153 into the glass tubes 135 and 136 (e.g. quarts glass tube). The optical fiber 152 is inserted into the glass tubes 135 and 136. The glass tubes 135 and 136 are juxtaposed. $P_i$ designates an incident optical signal. Then, in the step (b) shown in FIG. 13b, an optical signal $P_{i1}$ is made to be incident from the input port fiber 130-4, and twisting portions (or twisting and fusing portions) and a twisting, fusing and pulling portion are formed in the glass tube 135 by a method similar to that of FIG. 6 while monitoring the optical outputs $P_{o1/2}$ of the output port fibers 130-1 and 130-2. When the optical outputs of 130-1 and 130-2 becomes an equal output, the process of the step (b) is completed. Then, in the step (c) shown in FIG. 13c, an optical signal $P_{i2}$ is made to be incident from the input port fiber 131-2, and twisting portions (or twisting and fusing portions) and a twisting, fusing and pulling portion are manufactured by a method same as the above step (b) while monitoring the optical output $P_{o2/2}$. Finally, in the step (d) shown in FIG. 13d, both ends of the glass tube are sealed with an adhesive agent 9. High polymer can be filled in the glass tubes 135 and 136 to relieve mechanical vibration and impact. Further, the process of the above steps (b) and (c) can be carried out simultaneously. The reference numerals in FIGS. 13a–13d same as FIG. 12 designate the same portion as FIG. 12.

Figure 14:
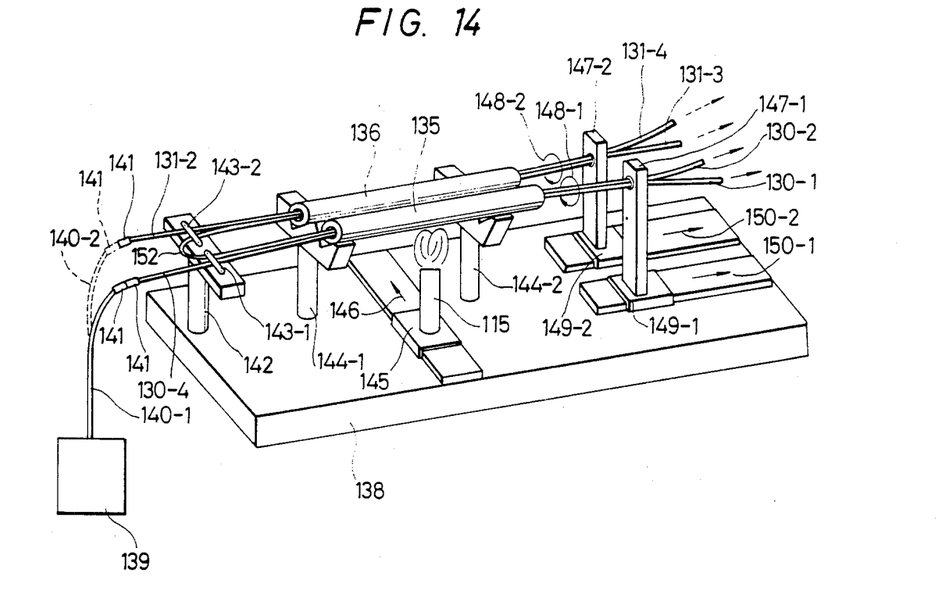
FIG. 14 is a perspective view showing the manufacturing process of the optical star coupler connected without any splicing as shown in FIG. 12.

FIG. 14 shows an embodiment of the apparatus for manufacturing the optical star coupler connected without any splicing of the present invention. First, the components are described. Numeral 139 designates a laser light source (e.g. He-Ne laser), and it makes a light to be incident into input port fibers 130-4 and 131-2 through dummy optical fibers 140-1 and 140-2. Numeral 141 designates a connector. Numeral 142 designates a stock on which optical fibers 131-2, 130-4 and 152 are fixed, and numerals 143-1 and 143-2 the fixing jigs thereof. Numerals 144-1 and 144-2 designate stocks for fixing the glass tubes. Numeral 145 designates a bed on which a oxyhydrogen burner 115 is mounted, and it has a mechanism by which it can move in the direction shown by the arrow 146. Numerals 147-1 and 147-2 designate the components provided with a mechanism for fixing optical fiber bundles and a rotating mechanism for rotating the above optical fiber bundles in the directions of arrows 148-1 and 148-2 to provide twists to the above optical fiber bundles. Numerals 149-1 and 149-2 designate mechanisms for moving the above componets 147-1 and 147-2 in the two directions of. arrows 150-1 and 150-2. Numeral 138 designates a base. This apparatus is an apparatus in which the glass tube 135 is first heated to make an optical star coupler, and the oxyhydrogen burner 115 is moved in the direction of the arrow 146 to heat the glass tube 136 thereby making another optical star coupler. However, if another oxyhydrogen burner is provided and laser light is made to be incident simultaneously into the input port fibers 130-4 and 131-2, the twisting, fusing and pulling of the respective optical fiber bundles can be carried out at the same time. In FIG. 14, the same numerals as that in FIGS. 13a–13b designate the same portions.

Figure 15:
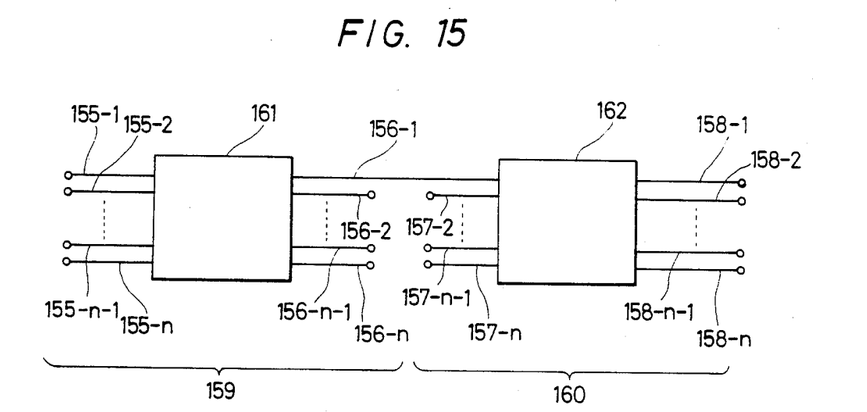
FIG. 15 is an illustration for explaining tandem connection of optical star couplers.

The optical star coupler connected without any splicing of the present invention is not limited by the above embodiments. For instance, it can be applied to a construction in which a nxn type optical power dividers 159 and 160 each having n input port fibers and n output port fibers are connected in tandem as shown in FIG. 15. In this case, 155-1, 156-1 and 158-1 are formed of one common optical fiber. In addition, the numbers of ports of the optical power dividers 159 and 160 can be different. The material of the optical fibers can be a compound system or plastic fiber other than a quartz system. For the glass tube, high quartz glass tube or a compound system glass tube other than quartz tube can be also used. Selection can be made according to the material of the optical fibers used. It can also be applied to a construction in which three or more optical star couplers are connected in tandem.

Incidentally, numerals 155-1 to 155-n, 156-2 to 156-n, 157-2 to 157-n and 158-1 to 158-n designate input and output port fibers, and 161 and 162 designate optical mixing portions.

As described above, according to the optical star coupler and the manufacturing method thereof of the present invention, low insertion loss, less power deviation and low cost can be realized also to an optical star coupler for single-mode optical fiber, particularly to an optical star coupler for equally divided single-mode optical fiber having the input and output ports of the ratio n:n in number, in addition to an optical star coupler for multi-mode optical fibers.

Further, according to the present invention, a low-loss and small-sized optical star coupler connected without any splicing can be constructed. Moreover, in the prior art, a plurality of optical star couplers need to be spliced to each other with thermal fusing technique or the like, but, in the present construction, such work is not included, and an integrated process is utilized or it is possible to make a plurality of optical star couplers at the same time, so that it can be expected to mass-produce optical star couplers connected without any splicing at a low cost.

As to the matters related to the optical star coupler of the present invention which are not described in this specification, usual knowledge in this technical field can be utilized.

Obviously, many modifications and variations of the present invention are possible in light of the above teachings. It is therefore to be understood that within the scope of the appended claims the invention may be practiced otherwise than as specifically described.

What is claimed is:

1. An optical star coupler comprising:
a protection tube;
a plurality of optical fibers suspended in said protection tube, having a twisting, fusing and pulling portion at a central portion of said optical fibers and twisting and fusing portions on both sides of said twisting, fusing and pulling portion; and
means for fixing said optical fibers on both ends of said protection tube.

2. The optical star coupler as claimed in claim 1, further comprising a resin filled in said protection tube.

3. The optical star coupler as claimed in claim 1, further comprising a liquid filled in said protection tube.

4. The optical star coupler as claimed in claim 1, wherein the diameter of said protection tube is thinner in substantially the center of said protection tube than at other portions thereof.

5. The optical star coupler as claimed in claim 1, wherein the outer diameter of both ends of said protection tube are thinner than other portions thereof.

6. The optical star coupler as claimed in claim 1, wherein said protection tube has at least one hole for inserting at least one of a liquid and a resin inside of said protection tube.

7. The optical star coupler as claimed in claim 1, wherein said protection tube is a semicircular tube.

8. A method of making an optical star coupler, comprising the steps of:
inserting a plurality of optical fibers into a protection tube so as to be suspended therein;
twisting said optical fibers;
fusing substantially the central portion of said optical fibers by heating said optical fibers through said protection tube;
pulling said optical fibers while heating said optical fibers through said protection tube;
fusing both sides of said substantially the central portion of said optical fibers by heating said optical fibers through said protection tube; and
fixing said optical fibers on both ends of said protection tube.

9. The method of making an optical star coupler as claimed in claim 8, further comprising the step of filling resin into said protection tube.

10. The method of making an optical star coupler as claimed in claim 8, further comprising the step of filling liquid into said protection tube.

11. The method of making an optical star coupler as claimed in claim 8, wherein said step of twisting said optical fibers includes the step of rotating chucks around the axis of said optical fibers in opposite directions to each other.

12. The method of making an optical star coupler as claimed in claim 8, wherein said step of pulling said optical fibers incldues the step of moving headstocks using headstock driving mechanisms in opposite directions for pulling the optical fibers.

13. An optical star coupler comprising:
first and second protection tubes;
first and second pluralities of optical fibers suspended in respective ones of said first and second protection tubes, each of said plurality of optical fibers having a twisting, fusing and pulling portion at substantially a central portion of said optical fibers and twisting and fusing portions on both sides of said twisting, fusing and pulling portion, respectively; and
means for fixing said first and second plurality of optical fibers on both ends of said respective protection tubes, wherein one of said first plurality of optical fibers exits said first protection tube and enters said second protection tube as one of said second plurality of optical fibers.

14. The optical star coupler as claimed in claim 13, further comprising a resin filled in each of said first and second protection tubes.

15. The optical star coupler as claimed in claim 13, further comprising a liquid filled in each of said first and second protection tubes.

16. A method of making an optical star coupler, comprising the steps of:
- inserting a first plurality of optical fibers into a first protection tube so as to be suspended therein;
- inserting a second plurality of optical fibers including one of said first plurality of optical fibers into a second protection tube so as to be suspended therein;
- twisting said first plurality of optical fibers;
- twisting said second plurality of optical fibers;
- fusing substantially the central portion of said first plurality of optical fibers by heating said first plurality of optical fibers through said first protection tube;
- fusing substantially the central portion of said second plurality of optical fibers by heating said second plurality of optical fibers through said second protection tube;
- pulling said first plurality of optical fibers while heating said first plurality of optical fibers through said first protection tube;
- pulling said second plurality of optical fibers while heating said second plurality of optical fibers through said second protection tube;
- fusing both sides of said substantially the central portion of said first plurality of optical fibers by heating said first plurality of optical fibers through said first protection tube;
- fusing both sides of said substantially the central portion of said second plurality of optical fibers by heating said second plurality of optical fibers through said second protection tube;
- fixing said first plurality of optical fibers at both ends of said first protection tube; and
- fixing said second plurality of optical fibers at both ends of said second protection tube.

17. The method of making an optical star coupler as claimed in claim 16, further comprising the step of filling a resin in said first and second protection tubes.

18. The method of making an optical star coupler as claimed in claim 16, further comprising the step of filling a liquid in said first and second protection tubes.

* * * * *